United States Patent [19]
Ohgi

[11] Patent Number: 5,638,239
[45] Date of Patent: Jun. 10, 1997

[54] TAPE CASSETTE HAVING A PLURALITY OF DETECTION HOLES FOR USE WITH A RECORDING/REPRODUCING DEVICE HAVING A DECTION PIN LOCATED IN ONE OF A PLURALITY OF POSITIONS

[75] Inventor: Takashi Ohgi, Miyagi, Japan

[73] Assignee: Sony Corporation, Tokyo, Japan

[21] Appl. No.: 392,350

[22] Filed: Feb. 22, 1995

[30] Foreign Application Priority Data

Feb. 25, 1994 [JP] Japan ................. 6-028350

[51] Int. Cl.⁶ .................. G11B 19/04; G11B 15/04
[52] U.S. Cl. .................................................. 360/132
[58] Field of Search ............................. 360/132, 60

[56] References Cited

U.S. PATENT DOCUMENTS

| | | | |
|---|---|---|---|
| 4,844,378 | 7/1989 | Oishi | 360/132 X |
| 5,218,502 | 6/1993 | Tanaka et al. | 360/132 |
| 5,455,722 | 10/1995 | Fujii et al. | 360/132 X |

Primary Examiner—John H. Wolff
Attorney, Agent, or Firm—William S. Frommer; Alvin Sinderbrand

[57] ABSTRACT

A tape cassette having a recording medium for use with a recording/reproducing device having a detection mechanism including a detection pin located in one of a plurality of positions and being adaptable for insertion into the tape cassette being currently used therewith so as to determine whether a recording operation may be performed involving the recording medium of the currently used tape cassette. The tape cassette includes a housing and a prevention plug. The housing includes first and second detection holes which are adapted to accommodate the detection pin and which are located so as to respectively correspond to the first and second positions. The prevention plug is movable between a first location and a second location in which the plug covers the first and second detection holes so as to prevent the detection pin from being inserted therethrough when the plug is in the first location and in which the plug uncovers the first and second detection holes so as to permit the detection pin to be inserted therethrough when the plug is in the second location.

9 Claims, 6 Drawing Sheets

TAPE CASSETTE HAVING A PLURALITY OF DETECTION HOLES FOR USE WITH A RECORDING/REPRODUCING DEVICE HAVING A DECTION PIN LOCATED IN ONE OF A PLURALITY OF POSITIONS

BACKGROUND OF THE INVENTION

1. Field of the Invention

The present invention relates to a tape cassette having a plug member and an identification hole to identify predetermined matters from a depth of the identification hole and a color of a predetermined depth position of the identification hole by opening and closing the identification hole in accordance with movement of the plug member.

2. Description of the Related Art

FIG. 1 of the accompanying drawings shows a tape cassette having a plug member of this kind. FIG. 1 shows an 8-mm video cassette used in an 8-mm video camera. As shown in FIG. 1, this 8-mm video cassette includes a cassette housing 1 composed of an upper cassette shell 2 and a lower cassette shell 3 fastened together by some suitable means (not shown). The cassette housing 1 incorporates a supply reel and a take-up reel on which a magnetic tape may be wound and a part of the magnetic tape is exposed to the front wall of the cassette housing 1, though not shown. The magnetic tape is exposed to the front wall of the cassette housing 1 and this front wall can freely be opened and closed by a cassette lid 4 pivotally attached to the front portion of the upper cassette shell 2.

The cassette housing 1 has a rear user label area 5 formed on the rear surface thereof. A mis-erase prevention indication window 6 is formed on one side of the rear user label area 5. The mis-erase prevention indication window 6 can be opened and closed by a mis-erase prevention plug 7 made of a material of red color. The mis-erase prevention plug 7 can be accommodated in a plug accommodating portion (not shown) formed on the inside of the mis-erase prevention indication window 6 so as to become freely slidable. The lower cassette shell 3 has a mis-erase prevention detection hole 8 defined on the lower surface thereof in association with the plug accommodating portion. The mis-erase prevention detection hole 8 can be opened and closed by the mis-erase prevention plug 7. Therefore, it is possible to open and close the mis-erase prevention detection hole 8 by sliding the mis-erase prevention plug 7 through the mis-erase prevention indication window 6.

With the mis-erase prevention indication window 6 formed on the rear surface of the cassette housing 1, it becomes possible for the user to slide the mis-erase prevention plug 7 and to visually identify the plugged state of the mis-erase prevention plug 7.

When the cassette housing 1 is loaded above a mis-erase prevention detection mechanism (not shown) and information is recorded and reproduced, the mis-erase prevention detection hole 8 defined on the lower surface of the lower cassette shell 3 serves to determine whether or not information can be recorded on a magnetic tape incorporated in the cassette housing 1. Therefore, when the 8-mm video cassette is loaded on a so-called mechanical deck, such as an 8-mm video camera or the like, a detection pin of the mis-erase prevention detection mechanism is inserted into the mis-erase prevention detection hole 8. Then, based on detected results obtained when the difference of depths of the mis-erase prevention detection hole 8 are detected by the detection pin, i.e., detected results obtained when it is determined whether the mis-erase prevention detection hole 8 is closed or opened by the mis-erase prevention plug 7, it is possible to determine whether or not the 8-mm video cassette is in the recordable state.

The plugged state of the mis-erase prevention plug 7 in the 8-mm video cassette thus arranged will be described below.

When the 8-mm video cassette is in the recordable state, the mis-erase prevention indication window 6 on the rear surface of the cassette housing 1 is fully opened to make it possible for the user to visually confirm the inside of the mis-erase prevention indication window 6 of the same red color forming a part of the cassette housing 1. Concurrently therewith, the mis-erase prevention detection hole 8 defined on the lower surface of the lower cassette shell 3 is closed by the mis-erase prevention plug 7 and therefore the mis-erase prevention hole 8 becomes shallow. Accordingly, the detection pin is not engaged with the mis-erase prevention detection hole 8, whereby the mis-erase prevention detection mechanism can detect the recordable state of the 8-mm video cassette. Also, it is possible for the user to detect the recordable state of the 8-mm video cassette by visually confirming the color (same color as those of the upper and lower cassette shells 2 and 3) of the inside of the opened mis-erase prevention indication window 6.

When on the other hand the 8-mm video cassette is not in the recordable state, the mis-erase prevention indication window 6 is closed by the mis-erase prevention plug 7 and the red color of the mis-erase prevention plug 7 becomes able to be visually confirmed. Therefore, it becomes possible for the user to visually confirm based on a difference of colors of the mis-erase prevention plug 7 and the upper and lower shells 2 and 3 that the 8-mm video cassette is not in the recordable state. Concurrently therewith, the mis-erase prevention detection hole 8 of the lower cassette shell 3 is opened and the mis-erase prevention detection hole 8 becomes deep. Accordingly, the detection pin is engaged with the mis-erase prevention detection hole 8 and it is possible for the user to detect based on the action of the detection pin 8 that the 8-mm video cassette is not in the recordable state. In this case, the color of the inside of the mis-erase prevention detection hole 8 is changed from the red color of the mis-erase prevention plug 7 to the color of the upper and lower cassette shells 2 and 3. Therefore, the user is able to visually confirm based on the difference of colors that the 8-mm video cassette is not in the recordable state, similarly.

The same assignee of the present application has filed Japanese patent applications Nos. 57-277302 and 06-027561 (corresponding U.S. patent application also was filed), Japanese patent application No. 05-280704 (corresponding U.S. patent application and European patent application also were filed). Further, the same assignee of the present application has the U.S. Pat. No. 5,065,955.

Since however the above-mentioned tape cassette includes the mis-erase prevention detection hole 8 defined on the lower cassette shell 3 of the cassette housing 1 to detect from under the cassette housing 1 whether or not the 8-mm video cassette is in the recordable state, the so-called mechanical deck has to dispose a mis-erase prevention detection mechanism on the thickness direction of a tape cassette loaded thereon. Therefore, the dimension of the mechanical deck is increased in the thickness direction of the tape cassette, hindering the mechanical deck from being miniaturized. Because it is not possible to miniaturize the mechanical deck, it is desired to provide a tape cassette whose recordable state can be detected from the side surface of the cassette housing 1.

When the recordable state of the tape cassette is detected from the side surface of the cassette housing, it is not preferable to modify the detection mechanism greatly and the detection mechanism is generally formed of a system similar to the detection mechanism of the tape cassette in which the recordable state of the tape cassette can be detected from the lower cassette shell 3 side. With this arrangement, a space portion formed on the inside of the mis-erase prevention indication window serves also as a side surface mis-erase prevention detection hole (simply referred to hereinafter as "side surface detection hole") so that, when the mis-erase prevention hole (simply referred to hereinafter as "lower surface detection hole") defined on the lower surface of the lower cassette shell 3 is opened, the side surface detection hole also has to be opened.

In the above-mentioned tape cassette, when the side surface detection hole is opened by sliding the mis-erase prevention plug 7, the lower surface detection hole is closed. On the contrary, when the side surface detection hole is closed, the lower surface detection hole is opened. There is then the problem that the tape cassette having the plug member structure cannot be used as the tape cassette of the side surface detection type as it is.

SUMMARY OF THE INVENTION

In view of the aforesaid aspect, it is an object of the present invention to provide a tape cassette in which predetermined items can be identified by varying a depth of an identification hole.

It is another object of the present invention to provide a tape cassette in which predetermined items can be visually identified based on a color of the inside through an identification hole when the identification hole is opened.

According to an aspect of the present invention, there is provided a tape cassette which includes a pair of upper and lower cassette shells in which a magnetic tape is accommodated, a plug member slidably provided in a plug accommodating portion of a cassette housing, and an identification hole defined on a part of the plug accommodating portion and a colored portion of color different from that of the upper and lower cassette shells disposed in the identification hole at its depth position of a predetermined depth of greater when the identification hole is opened, wherein it is possible to identify predetermined items by changing a depth of the identification hole when the identification hole is opened and closed by sliding the plug member.

DETAILED DESCRIPTION OF THE PREFERRED EMBODIMENTS

A tape cassette according to the embodiments of the present invention will be described with reference to the drawings.

Figure 1:
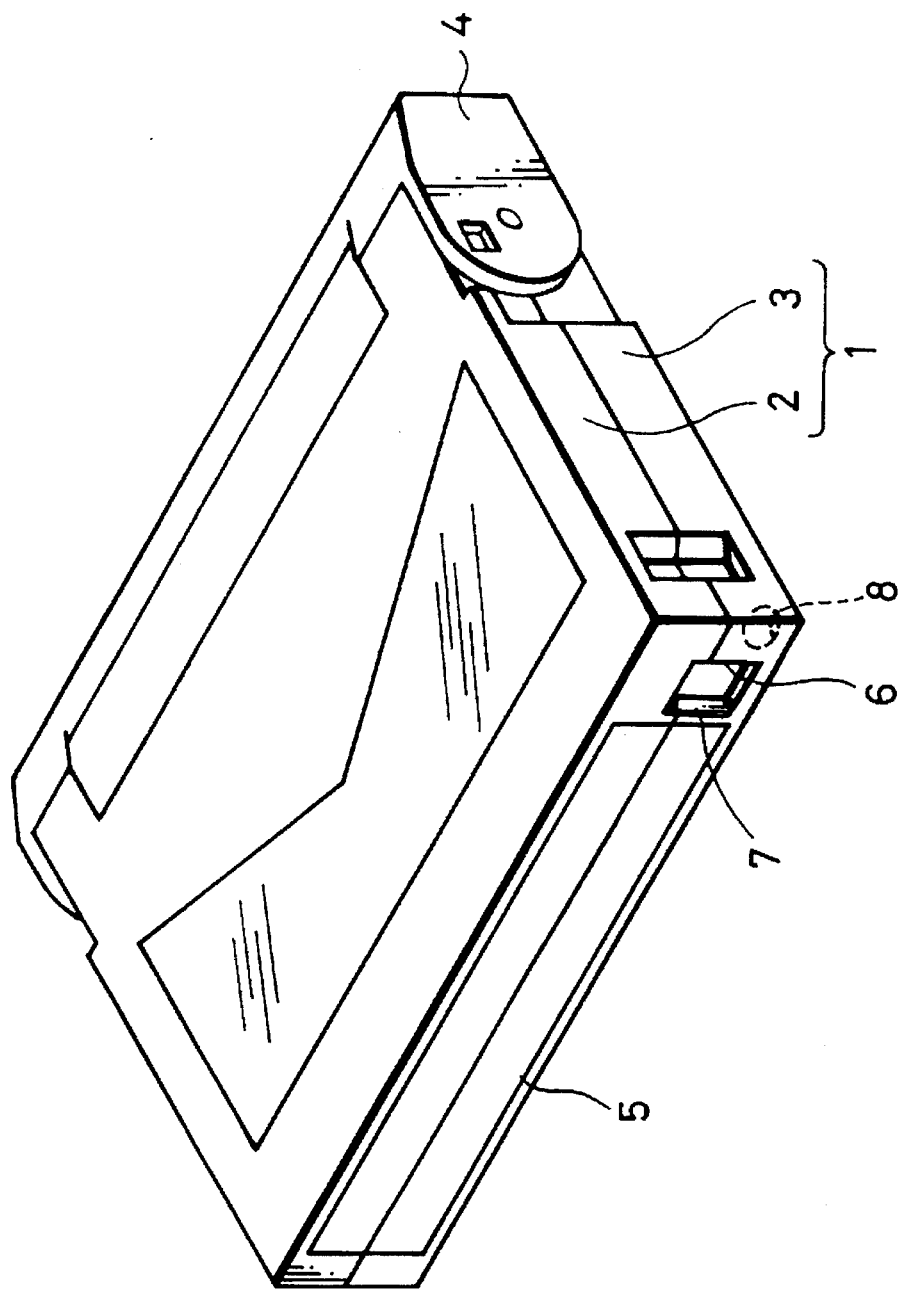
FIG. 1 is a perspective view showing an outer face of a tape cassette from its rear surface side.
Figure 7:
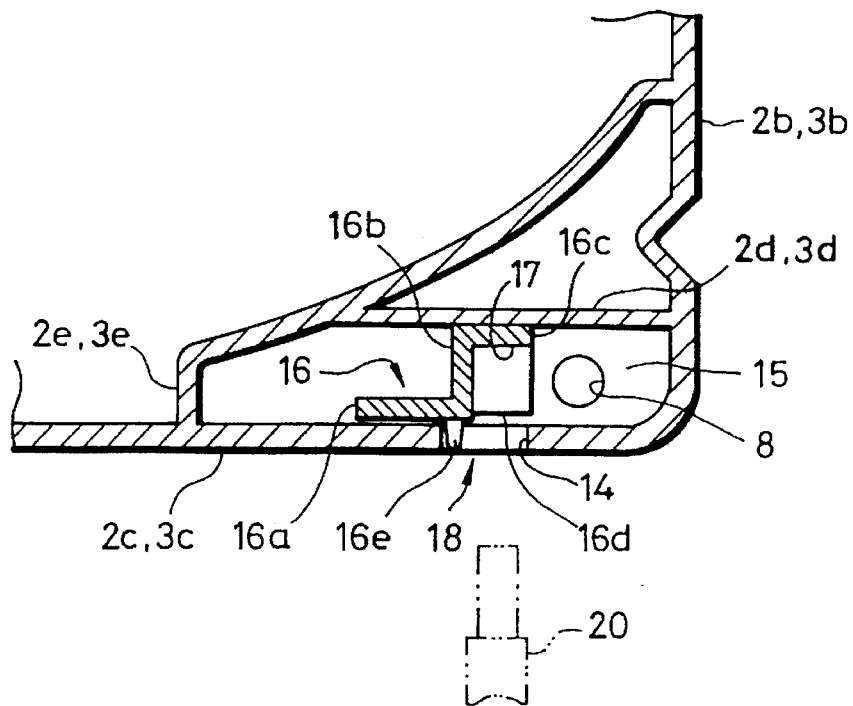
FIG. 7 is an enlarged cross-sectional view taken along the line VI—VI in FIG. 4 and illustrating the state that the mis-erases prevention detection hole is opened.
Figure 8:
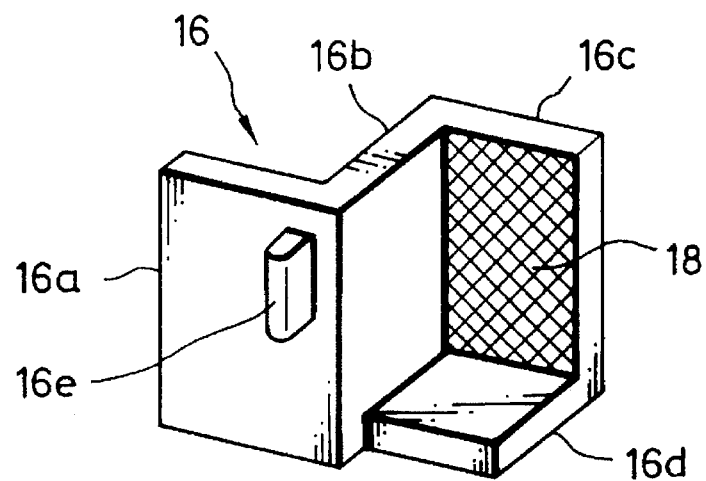
FIG. 8 is a perspective view of a mis-erase prevention plug according to the first embodiment of the present invention.
Figure 9:
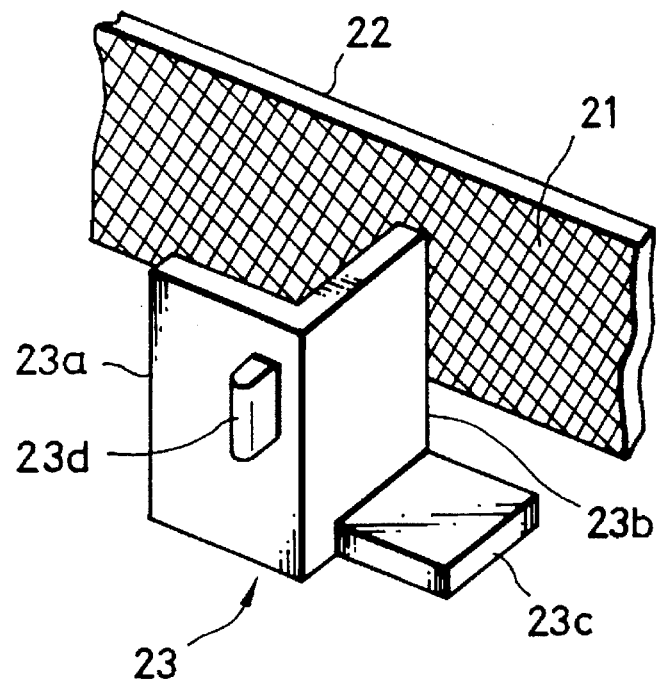
FIG. 9 is a perspective view showing a main portion of a second embodiment according to the present invention.

FIGS. 2 to 8 show a first embodiment and FIG. 9 shows a second embodiment according to the present invention. In FIGS. 2 to 7, elements and parts identical to those of FIG. 1 are marked with the same references.

Figure 2:
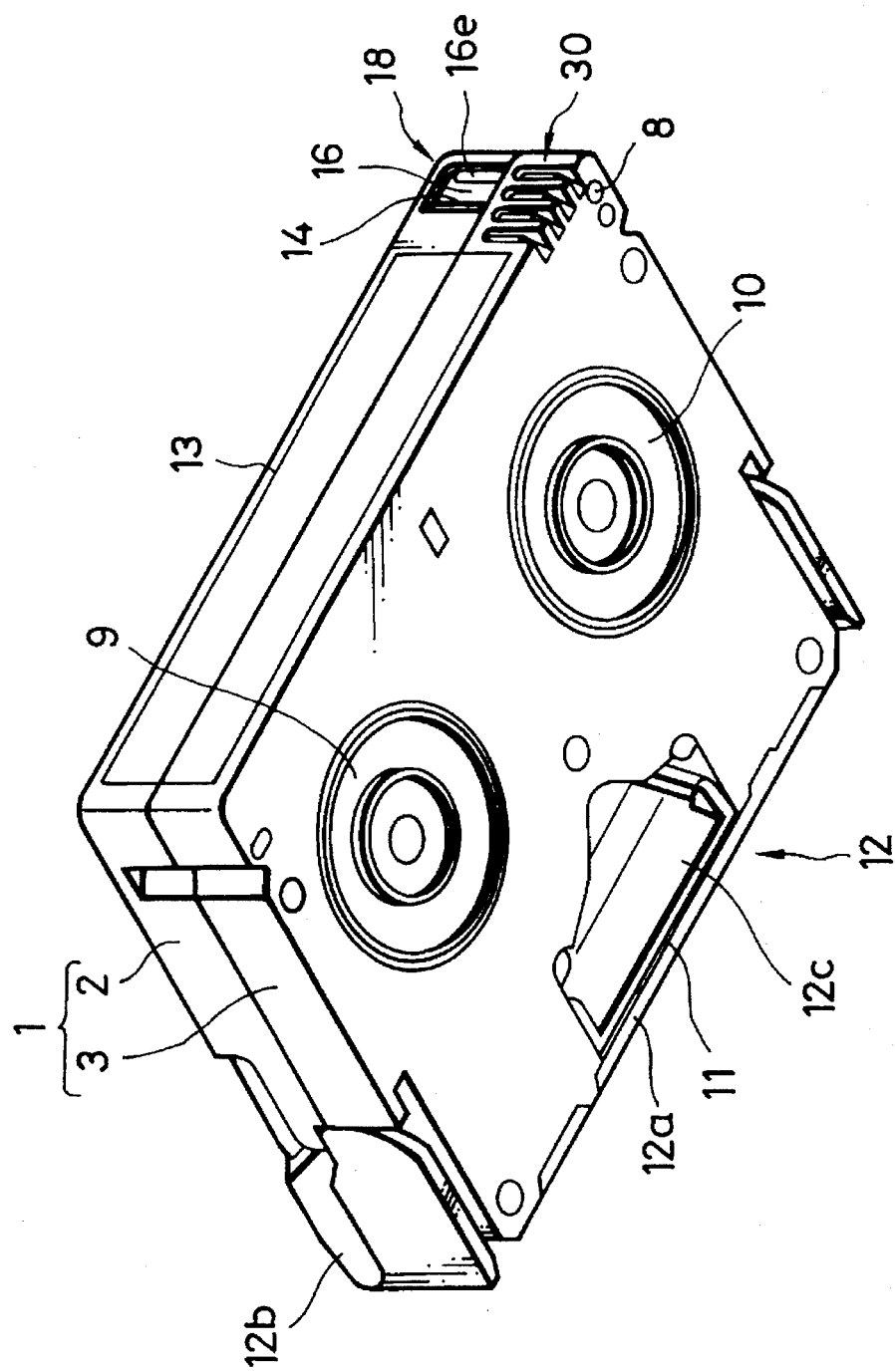
FIG. 2 is a perspective view showing an outer face of a tape cassette according to a first embodiment from its bottom surface side.
Figure 3:
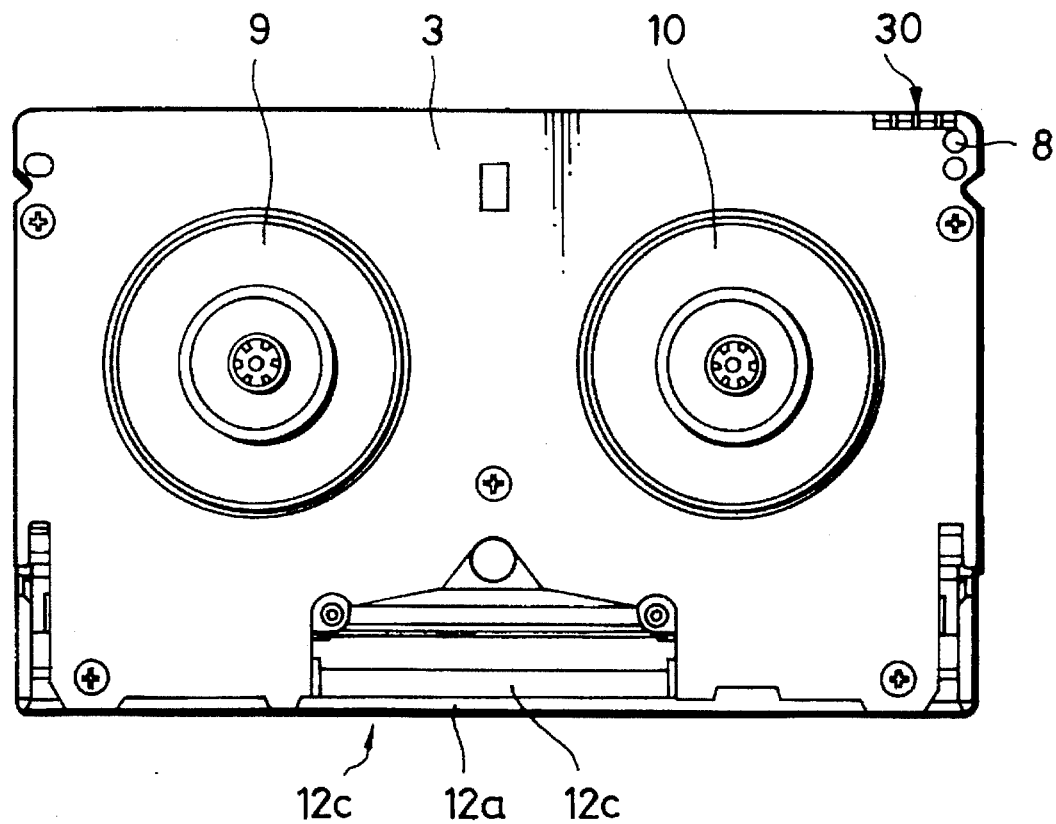
FIG. 3 is a bottom view of FIG. 1.
Figure 4:
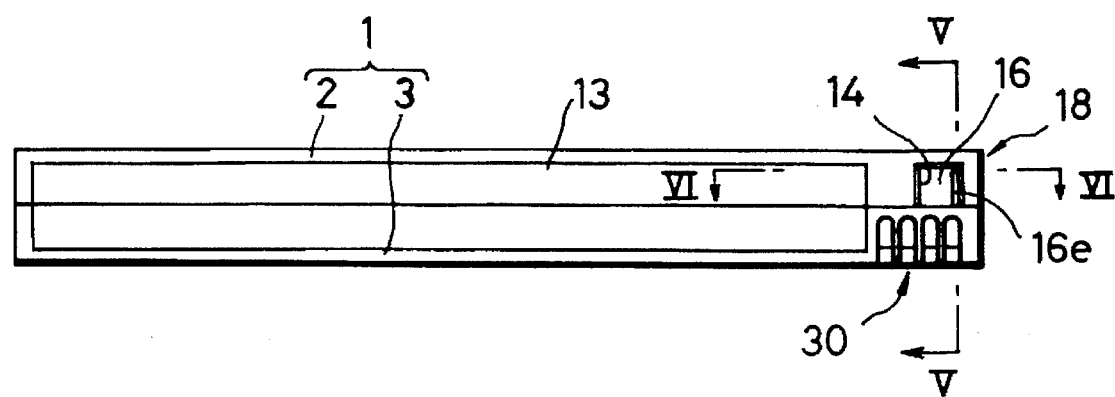
FIG. 4 is a rear view thereof.

In the first embodiment shown in FIGS. 2 to 8, the present invention is applied to a digital audio tape cassette, for example. In FIGS. 2 to 4, there is shown a tape cassette having a cassette housing 1 made of a synthetic resin having a proper rigidity (e.g., PP (polypropylene), ABS (acrylonitrile styrene butadiene styrene resin), HIPS (high impact polystyrene), et cetera.). The cassette housing 1 is composed of the upper cassette shell 2 and the lower cassette shell 3 which are fastened together by some suitable means (not shown).

The cassette housing 1 incorporates a supply reel 9 and a take-up reel 10 on which a magnetic tape (not shown) is wound as a recording medium. The magnetic tape supplied from the supply reel 9 is guided by a tape guide provided on one opening portion to travel on a mouth portion 11 formed on the front wall of the cassette housing 1, further guided by a tape guide provided on the other opening portion and then rewound around the take-up reel 10. A lid 12 is supported to the mouth portion 11 of the cassette housing 1 and the two opening portions so as to become openable and closable. When the lid 12 is closed, the lid 12 can protect the magnetic tape traveled on the front surface of the cassette housing 1. The lid 12 is composed of three lids, i.e., a front lid 12a, a top lid 12b and a back lid 12c.

Figure 5:
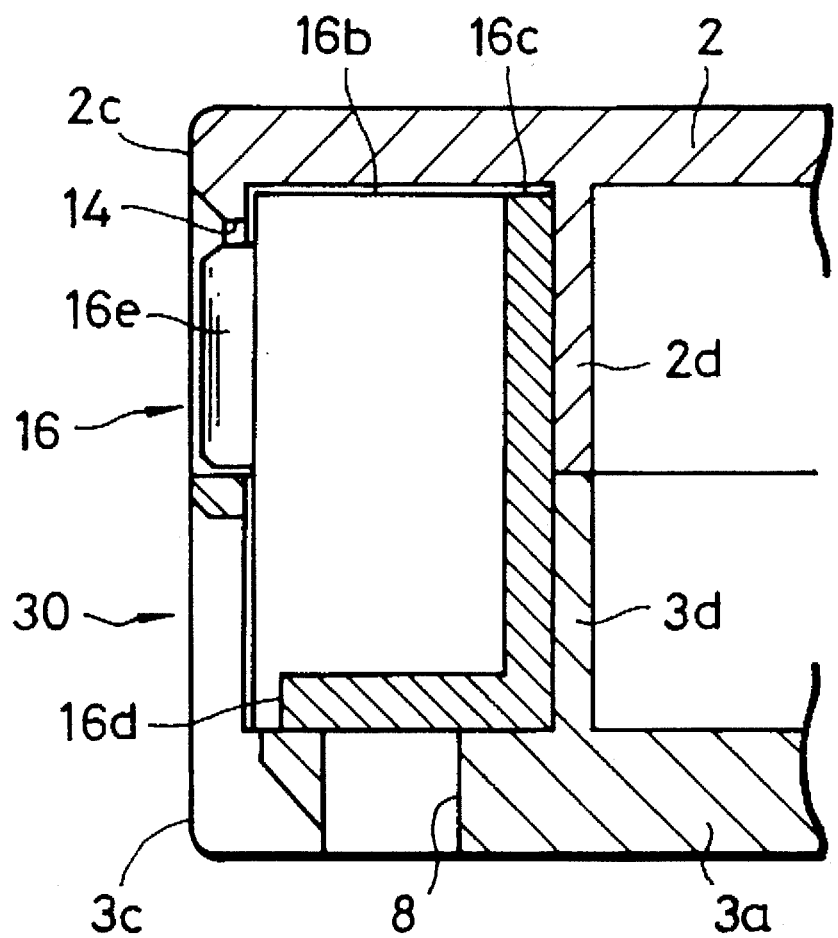
FIG. 5 is an enlarged cross-sectional view taken along the line V—V in FIG. 4.

The cassette housing 1 has a rear user label area 13 formed on its rear surface. A mis-erase prevention indication window 14 is formed on one side of the rear user label area 13 by cutting the edge of the upper cassette shell 2 out. As shown in FIG. 5 and the following sheets of drawings, on the inside of the mis-erase prevention indication window 14 is formed a plug accommodating portion 16 which is substantially symmetrical in shape in the upper cassette shell 2 side and in the lower cassette shell 3 side. The plug accommodating portion 16 is encircled by an upper surface plate 2a, a side surface plate 2b, a rear surface plate 2c, a front and rear partition member 2d and a left and right partition member 2e of the upper cassette shell 2 and a lower surface plate 3a, a side surface plate 3b, a rear surface plate 3c, a front and rear partition member 3d and a left and right partition member 3e of the lower cassette shell 3. The whole of the plug accommodating portion 16 is shaped as substantially rectangular solid.

Figure 6:
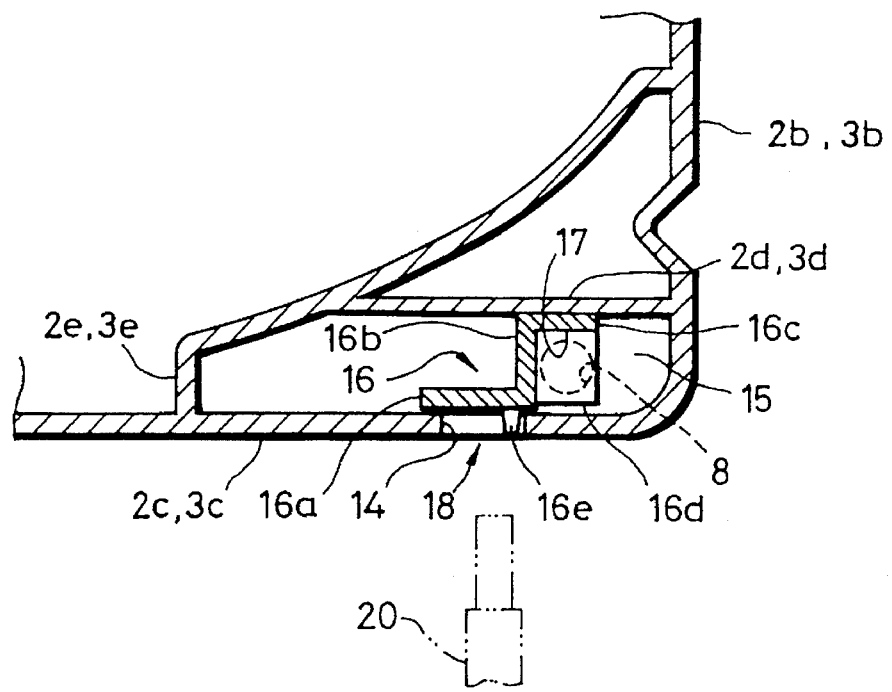
FIG. 6 is an enlarged cross-sectional view taken along the line VI—VI in FIG. 4 and illustrating the state that a mis-erase prevention detection hole is closed.

As shown in FIGS. 6 and 7, the front and rear partition members 2d, 3d of the upper and lower cassette shells 2, 3 are parallel to the rear surface plates 2c, 3c of the upper and lower cassette shells 2, 3. The mis-erase prevention plug 16 shows a specific example of a plug member and is accommodated between the rear surface plates 2c, 3c and the front and rear partition members 2d, 3d so that it can be slid in the surface direction. The lower surface plate 3a of the lower cassette shell 3 has at its position displaced from the mis-erase prevention indication window 14 toward the side surface plates 2b, 3b direction defined a mis-erase prevention detection hole 8 which is elongated in the upper and lower direction. The mis-erase prevention detection hole 8 shows a specific example of a first identification hole.

As shown in FIG. 8 or the like, the mis-erase prevention plug 16 is composed of a front surface member 16a, an intermediate member 16b and a rear surface member 16c whose faces are expanded in the upper and lower direction and which are coupled in a crank-shape as seen from the top and a bottom surface member 16d joined to the lower inside portions of the intermediate member 16b and the rear surface member 16c so as to be developed in the horizontal direction. A width of the front surface member 16a is larger than that of the mis-erase prevention indication window 14 and a width of the rear surface member 16c is substantially equal to that of the mis-erase prevention indication window 14. A colored portion 17 is formed on the front surface of the rear surface member 16c. Further, the front surface member 16a has an operation protrusion 16e formed on one side of the front surface thereof. The operation protrusion 16e is extended in the upper and lower direction and inserted into the mis-erase prevention indication window 14 so as to become slidable from the inside.

Therefore, the whole of the mis-erase prevention plug 16 can be slid in the right and left direction in a range in which the operation protrusion 16e inserted into the mis-erase prevention indication window 14 is moved. As shown in FIGS. 2, 4 and 6, when the operation protrusion 16e is placed at the right end of the mis-erase prevention indication window 14, the mis-erase prevention indication window 14 is completely closed by the front surface member 16a and the mis-erase prevention detection hole 8 defined in the lower surface of the lower cassette shell 3 is completely closed by the bottom surface member 16d.

On the other hand, as shown in FIG. 7, when the mis-erase prevention plug 16 is slid to move the mis-erase prevention indication window 14 to the left end, the mis-erase prevention indication window 14 is opened in accordance with the movement of the front surface member 16a and the colored portion 17 formed on the front surface of the rear surface member 16c distant by the length of the intermediate member 16b in the rearward is placed behind the mis-erase prevention indication window 14. The mis-erase prevention indication window 14 and the space portion extending from the inside of the mis-erase prevention indication window 14 to the colored portion 17 constitute a mis-erase prevention detection hole 18. The mis-erase prevention detection hole 18 shows a specific example of a second identification hole. The mis-erase prevention detection hole 18 is used to prevent the user from mis-erasing information recorded on the magnetic tape. A detection pin 20 of a mis-erase prevention detection mechanism provided on the mechanical deck, such as an audio apparatus or the like is inserted into the mis-erase prevention detection hole 18 to detect whether or not the tape cassette is in the recordable state.

At the same time when the mis-erase prevention detection hole 18 is opened, the mis-erase prevention detection hole 8 is completely opened so that, when the detection pin 20 of the mis-erase prevention detection mechanism is located under the mechanical deck, similarly to the mis-erase prevention detection hole 18, it becomes possible to detect by the mis-erase prevention detection hole 8 whether or not the cassette is in the recordable state. Incidentally, the dimension of the mis-erase prevention plug 16 is determined such that the mis-erase prevention plug 16 can be slid with a proper operation force. The mis-erase prevention plug 16 can be engaged at a desired position by a click mechanism provided between the mis-erase prevention plug 16 and the upper or lower cassette shell 2 or 3 when necessary.

In FIGS. 2 and 4, reference numeral 30 depicts a terminal connection portion to which connection terminals of the IC substrate are exposed. The terminal connection portion 30 accommodates a substrate on which the IC memory is mounted or a substrate having an IC memory dummy. The IC memory is able to memorize a variety of informations, such as kinds, use, class of tape cassette et cetera. The above-mentioned information is written in the IC memory and used, when necessary.

The mis-erase prevention plug 16 is made of preferably a synthetic resin, such as POM (poly acetal), PP (polypropylene) or the like and may of course be made of other synthetic resins. Further, the mis-erase prevention plug 16 may be made of various kinds of materials, such as metal, ceramics or the like. The color of the colored portion of the mis-erase prevention plug 16 may be any color so long as it is different from the color of the upper and lower cassette shells 2 and 3. Further, the color of the colored portion 17 may be the same as or different from the color of the mis-erase prevention plug 16. As a practical example of a combination of colors, it is considered, by way of example, that the upper and lower cassette shells 2, 3 are gray and the mis-erase prevention plug 16 is red. In this case, the color of the colored portion 17 becomes the same as the color of the mis-erase prevention plug 16.

However, a combination of the color of the upper and lower cassette shells 2, 3 and the color of the mis-erase prevention plug 16 is not limited to the above-mentioned example and other combinations of various colors can be applied to the present invention. Moreover, the color of the upper and lower cassette shells 2, 3 and the color of the mis-erase prevention plug 16 may be selected to be the same and only the color of the colored portion 17 may be changed. As a coloring method, there can be employed various coloring methods, such as a coloring method based on dichromatic molding, a coloring method for coating the colored portion 17 with a desired color by printing and a coloring method for bonding a desired colored tape on the colored portion 17 or the like.

According to the embodiment of the present invention, as shown in FIGS. 2, 4 and 6, when the mis-erase prevention indication window 14 formed on the rear surface of the cassette housing 1 is closed by the mis-erase prevention plug 16, the mis-erase prevention detection hole 18 is made shallow by the front surface member 16a of the mis-erase prevention plug 16 with the result that the detection pin 20 of the mis-erase prevention detection mechanism provided on the side so as to oppose the mis-erase prevention detection hole 18 cannot be inserted into the mis-erase prevention detection hole 18 at its predetermined depth. As a consequence, the recordable state of the tape cassette is detected by the detection pin 20. In that case, since the color of the front surface member 16a of the mis-erase prevention plug 16 is the same as that of the upper and lower cassette shells 2, 3, such color cannot attract the user and the user can identify based on the same color that the tape cassette is in the recordable state.

Since the mis-erase prevention detection hole 8 is closed by the bottom surface member 16d of the mis-erase prevention plug 16, similarly to the case of the mis-erase prevention detection hole 18, it is possible to detect based on a detection pin (not shown), which detect the recordable state of the tape cassette from under, that the video tape cassette is in the recordable state.

Then, when the user slides the mis-erase prevention plug 16 fitted into the mis-erase prevention indication window 14 by the operation protrusion 16e with a fingertip to thereby open the mis-erase prevention indication window 14 fully, the mis-erase prevention detection hole 18 is deeply opened, thereby making it possible to insert the detection pin 20 into the mis-erase prevention detection hole 18 up to its predetermined depth. Therefore, owing to the action of the detection pin 20, it is possible to detect that the tape cassette is not in the recordable state.

In that case, the colored portion 17 is disposed in the mis-erase prevention detection hole 18 at its predetermined depth position and the colored portion 17 can be seen from the outside. Since the colored portion 17 is provided on the front surface of the rear surface member 16c of the mis-erase prevention plug 16 and the color thereof is a color (e.g., red) different from the color (e.g., gray) of the upper and lower cassette shells 2 and 3, the color of the colored portion 17 attracts the user and the user can visually determine based on the color of the colored portion 17 that the tape cassette is not in the recordable state.

Concurrently therewith, the mis-erase prevention detection hole 18 that was closed by the bottom surface member 16d of the mis-erase prevention plug 16 is opened with the result that, similarly to the case of the mis-erase prevention detection hole 18, it is possible by the detection pin (not shown) of the mis-erase prevention detection mechanism which determines the recordable state of the tape cassette from underside that the tape cassette is not in the recordable state.

As described above, when the plug member is the mis-erase prevention plug 16, it is possible to change the depth of the mis-erase prevention detection hole 18 by sliding the mis-erase prevention plug 16. Therefore, the depth of the mis-erase prevention detection hole 18 is detected by the detection pin 20, whereby the mechanical deck can determine whether or not the tape cassette is in the recordable state. In a like manner, when the mis-erase prevention detection hole 18 is closed, the front surface member 16a of the same color as that of the upper and lower cassette shells 2, 3 can be seen. When on the other hand the mis-erase prevention detection hole 18 is opened, the color of the colored portion 17 that was seen in the deep portion of the mis-erase prevention detection hole 18 is different from that of the upper and lower cassette shells 2 and 3, Thus, when the user watches the color of the colored portion 17, it is possible for the user to visually determine whether or not the tape cassette is in the recordable state.

While it is determined base on the closed state of the mis-erase prevention detection hole 18 that the tape cassette is in the recordable state and it is determined based on the opened state of the mis-erase prevention detection hole 18 that the tape cassette is not in the recordable state as described above, the present invention is not limited thereto. Conversely, it is needless to say that it is determined based on the opened state of the mis-erase prevention detection hole 18 that the tape cassette is in the recordable state and it is determined based on the closed state of the mis-erase prevention detection hole 18 that the tape cassette is not in the recordable state.

FIG. 9 shows a tape cassette according to a second embodiment of the present invention in which a colored portion 21 is provided on the upper cassette shell 2. As shown in FIG. 9, there is provided a front and rear partition member 22 of which the front surface is used as the colored portion 21 (shown cross-hatched). The colored portion 21 is colored with a color different from that of the upper and lower cassette shells 2, 3 similarly to the colored portion 17 in the first embodiment of the present invention. As a method of coloring the colored portion 21, there can be applied the method based on dichromatic molding, the method for coating the colored portion 21 with a predetermined color by printing and the method of bonding a colored tape on the colored portion 22 or the like, similarly to the first embodiment of the present invention. Further, the colored portion 21 can be formed of a plate of desired color fixed to the upper or lower cassette shell 2 or 3.

When the colored portion 21 is formed on the upper cassette shell 2, as shown in FIG. 9, a mis-erase prevention plug 23 can be simplified in structure as compared with the case of the first embodiment. Specifically, the mis-erase prevention plug 23 is equivalent to the mis-erase prevention plug 16 of the first embodiment in which the rear surface member 16c of the mis-erase prevention plug 16 is removed. Other three members of the mis-erase prevention plug 23, i.e., a front surface member 23a, an intermediate member 23b and a bottom surface member 23c are similar to those of the mis-erase prevention plug 16. Also, the mis-erase prevention plug 23 has an operation protrusion 23d formed on the front surface member 23a, similarly. With this arrangement, it is possible to achieve effects similar to those of the first embodiment. Incidentally, the colored portion 21 may be formed on the lower cassette shell 3.

While the present invention has been described so far, the present invention is not limited to the above-mentioned embodiments and the following variant is also possible. That is, while information recorded on the magnetic tape is prevented from being mis-erased as an example that predetermined matters are identified by the depth of the identification hole as described above, the present invention is not limited thereto. By way of example, as other matters to be identified, there can be enumerated various identified matters, such as the kinds of tape cassettes (normal tape cassette and software tape cassette), the users (commercial tape cassette and professional tape cassette), usage (normal recording and recording exclusively used for music) and tape cassette having IC incorporated. To be more concrete, when the kind of tape cassette is identified, if a tape cassette is a normal tape cassette, then the colored portion 17 is set to red. If a tape cassette is a software tape cassette, then the color of the colored portion 17 is set to blue. In addition to red and blue, it is possible to use various colors.

While the present invention is applied to the digital audio tape cassette as described above, the present invention is not limited thereto and may be applied to a variety of tape cassettes, such as VHS video cassette and 8-mm video cassette using a magnetic tape as a recording medium.

Furthermore, while the mis-erase prevention detection hole 18 is provided on the rear surface on which the rear user label area is formed as described above, the present invention is not limited thereto and a mis-erase prevention detection hole may of course be formed on the side surface perpendicular to the rear surface. In this case, the detection pin of the mis-erase prevention detection mechanism has to be placed at the position corresponding to the mis-erase prevention detection hole.

As described above, according to the present invention, it becomes possible to identify predetermined items by changing a depth of identification hole when the identification hole is opened and closed in accordance with a movement of a plug member. Further, since the colored portion is provided at the identification hole at its position of predetermined depth or deeper, it is possible to identify predetermined items based on a difference of depth of the identification hole. Furthermore, when the identification hole is opened, the colored portion of color different from that of the upper and lower cassette shells can be seen through the identification hole. Thus, it is possible to visually identify the predetermined items.

Therefore, since the identification method on the side surface portion of the 8-mm video cassette is not changed, it is possible to protect the user from being confused. Thus, it is possible to provide a tape cassette in which predetermined items can be detected from the side surface portion of the cassette housing. In addition, since the predetermined items can be detected from the side surface portion of the cassette housing, a mechanical deck using this tape cassette can be miniaturized and reduced in thickness.

When the plug member is the mis-erase prevention plug, it is possible to change the depth of the mis-erase prevention detection hole serving as the identification hole by sliding the mis-erase prevention plug. Accordingly, it is possible to provide a tape cassette in which it is possible to determine based on the depth of the detection hole whether or not information can be recorded on the magnetic tape.

Further, a depth of a second identification hole formed on the side surface of the cassette housing is changed by opening and closing the plug member. Thus, it is possible to identify predetermined items on the basis of a difference of depth of the second identification hole. Also, when the second identification hole is opened, the colored portion of color different from that of the upper and lower cassette shells is placed in the second identification hole at it depth position of a predetermined depth or deeper. Therefore, it is possible to provide a tape cassette in which the predetermined items can be identified visually through the second identification hole.

Since the first and second identification holes are arranged such that, when one is opened, the other is opened and that, when one is closed, the other is closed, it is possible to provide a tape cassette in which, when the predetermined items are identified, the same result can be obtained by using any of the first and second identification holes.

Further, since the colored portion is formed by the plug member, it is possible to provide a tape cassette in which the predetermined items can be visually identified by the shape of the plug member.

Furthermore, since the colored portion is formed on the upper cassette shell or the lower cassette shell, it is possible to provide a tape cassette in which the predetermined items can be visually identified by the upper or lower cassette shell.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A tape cassette having a recording medium for use with a recording/reproducing device having a detection mechanism including a detection pin adaptable for insertion into the tape cassette being currently used therewith so as to determine whether a recording operation may be performed involving the recording medium of the currently used tape cassette, said detection pin being located in one of a first position and a second position, said tape cassette comprising:

a housing for accommodating said recording medium and having first and second detection holes and rear, lower and side surfaces, each of said first and second detection holes being located in one of said surfaces so as to respectively correspond to said first and second positions and being adaptable to accommodate said detection pin; and a prevention plug slidably arranged within said housing, said prevention plug having a front member, an intermediate member and a rear member arranged in a step-like manner and having a bottom member coupled to a lower portion of said intermediate and rear members, said prevention plug being movable between a first location and a second location in which said bottom member covers said first detection hole and said front member covers said second detection hole so as to prevent said detection pin from being inserted therethrough when said plug is in said first location and in which said bottom member uncovers said first detection hole and said front member uncovers said second detection hole so as to permit said detection pin to be inserted therethrough when said plug is in said second location.

2. A tape cassette according to claim 1, wherein said housing has a first color and said rear member of said prevention plug has a second color which is noticeably different from said first color and wherein said second color of said rear member is visible to a user when said prevention plug is in said second location.

3. A tape cassette according to claim 2, wherein said first color is gray and said second color is red.

4. A tape cassette according to claim 2, wherein said first detection hole is located in said lower surface of said housing and said second detection hole is located in said rear surface of said housing.

5. A tape cassette according to claim 2, wherein said first detection hole is located in said lower surface of said housing and said second detection hole is located in one of said side surfaces of said housing.

6. A tape cassette having a recording medium and being adaptable for use with first and second types of recording/reproducing devices each having a detection mechanism including a detection pin adaptable for insertion into the tape cassette being currently used therewith so as to determine whether a recording operation may be performed involving the recording medium of the currently used tape cassette, in which the detection pin of said first type of recording/reproducing device is arranged so as to engage the tape cassette at a first position and the detection pin of said second type of recording/reproducing device is arranged so as to engage the tape cassette at a second position, said tape cassette comprising:

a housing for accommodating said recording medium and having first and second detection holes in which said first detection hole is located in said first position and said second detection hole is located in said second position, each of said first and second detection holes being adaptable to accommodate the respective detection pin, said housing having an external surface having a first color; and a prevention plug slidably arranged within said housing, said prevention plug having a front member, an intermediate member and a rear member arranged in a step-like manner and having a bottom member coupled to a lower portion of said intermediate and rear members, said prevention plug being movable between a first location and a second location in which said bottom member covers said first detection hole so as to prevent the detection pin of said first type of recording/ reproducing device from being inserted therethrough and said front member covers said second detection hole so as to prevent the detection pin of said second type of recording/reproducing device from being inserted therethrough when said plug is in said first location and in which said bottom member uncovers said first detection hole so as to permit the detection pin of said first type of recording/reproducing device to be inserted therethrough and said front member uncovers said second detection hole so as to permit the detection pin of said second type of recording/reproducing device to be inserted therethrough when said plug is in said second location, said rear member of said prevention plug having a second color which is noticeably different from said first color and which is visible from outside the tape cassette when said prevention plug is in said second location so as to provide an indication to a user as to whether a recording operation may be performed involving the recording medium of the respective tape cassette.

7. A tape cassette according to claim 6, wherein said first color is gray and said second color is red.

8. A tape cassette according to claim 6, wherein said housing has a rear surface and a lower surface and wherein said first detection hole is located in said lower surface of said housing and said second detection hole is located in said rear surface of said housing.

9. A tape cassette according to claim 6, wherein said housing has a lower surface and a plurality of side surfaces and wherein said first detection hole is located in said lower surface of said housing and said second detection hole is located in one of said side surfaces of said housing.

* * * * *